Figure 1:
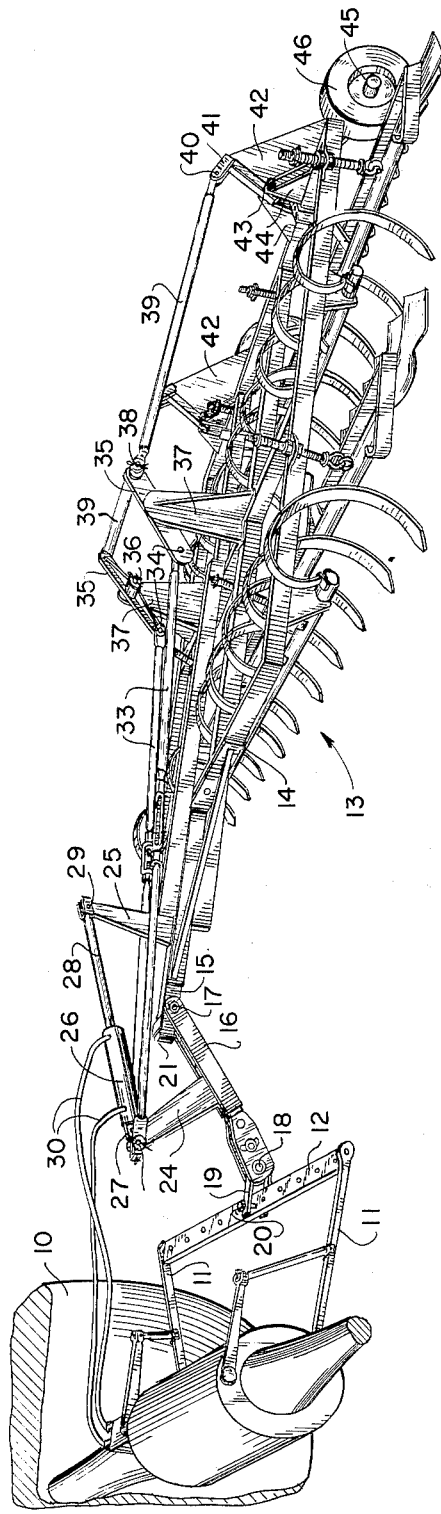

Aug. 24, 1965  I. W. RICHARDSON  3,202,225
JACK KNIFE TONGUE
Filed July 31, 1963
2 Sheets-Sheet 1

INVENTOR
IRWIN W. RICHARDSON

BY
ATTORNEY

Aug. 24, 1965
I. W. RICHARDSON
3,202,225
JACK KNIFE TONGUE
Filed July 31, 1963
2 Sheets-Sheet 2
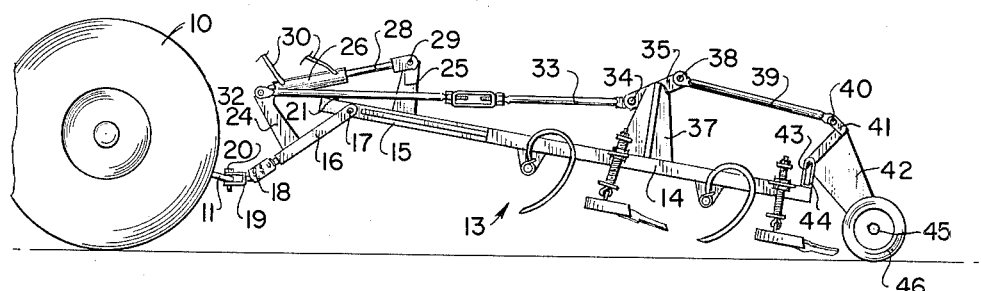
FIG. 3
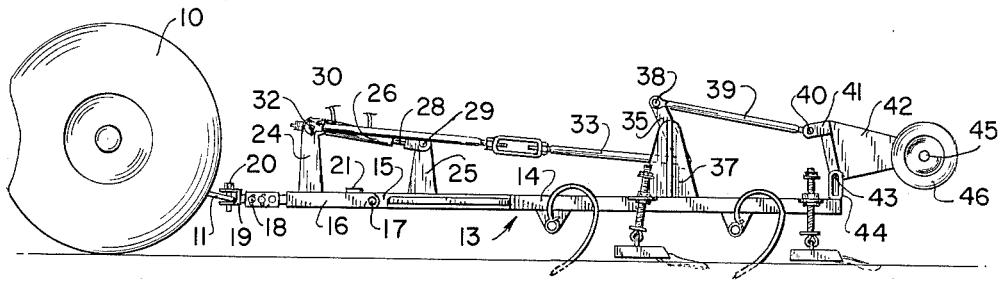
FIG. 4
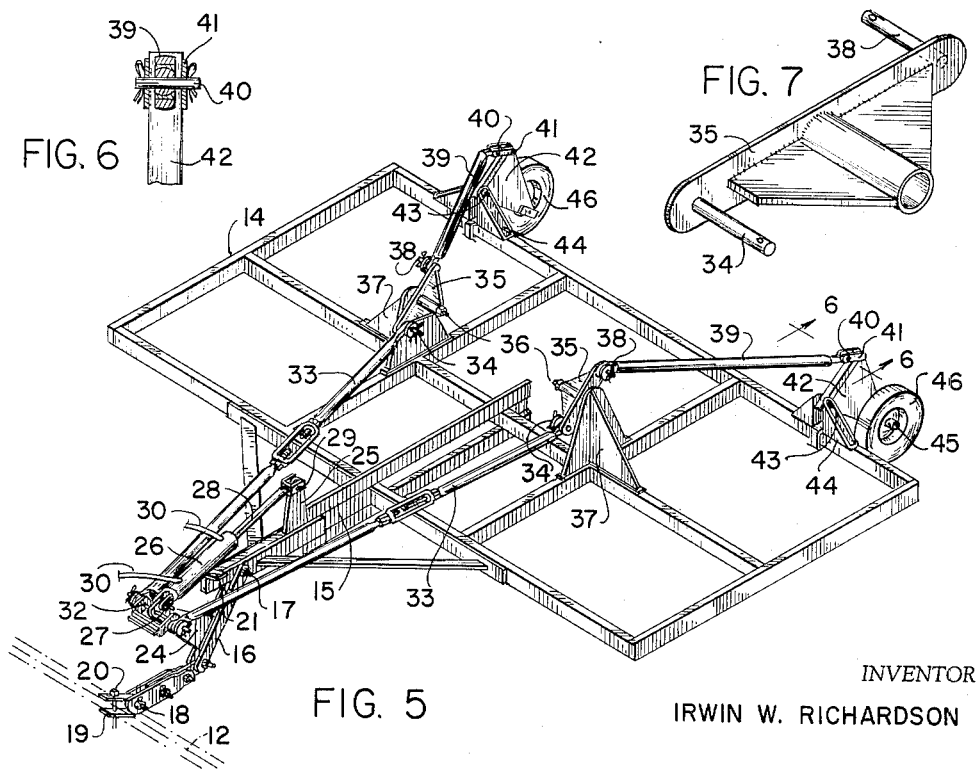
FIG. 6
FIG. 7
FIG. 5
INVENTOR
IRWIN W. RICHARDSON
BY
ATTORNEY

3,202,225
JACK KNIFE TONGUE
Irwin W. Richardson, Lady Lake, Fla., assignor to I. W. Richardson Co., Inc., a corporation of Florida
Filed July 31, 1963, Ser. No. 298,915
3 Claims. (Cl. 172—328)

This invention relates to agriculture including apparatus and equipment employed in the cultivation and care of crops and including structure having mechanisms for lowering earth-working implements into engagement with and for raising the same from the earth to facilitate transportation and storage of such equipment.

The invention relates particularly to agricultural implements used in connection with a propelling vehicle and to mechanisms by which the earth-engaging portions of such implements may be lowered into or elevated from engagement with the earth and by which the major portion of the weight of the implements are carried by such propelling vehicle.

Heretofore various structures have been provided for lowering earth-working implements into and for raising the same from engagement with the earth and for maintaining such implements in suspended position during transportation from one location to another. These structures generally have relied upon a two or three point hitch connection to the hydraulic system of a tractor or other propelling vehicle in a manner that when the implement is raised from the earth the full weight thereof is supported by the tractor.

It is an object of the invention to provide earth-working equipment having means for lowering the same into and for raising the same from engagement with the earth and utilizing a pivotally connected jack-knife tongue operable from the hydraulic or power system of a propelling vehicle and with such structure including mechanical linkage for operating a pair of rear supporting wheels.

Another object of the invention is to provide an earth-working implement connected to a propelling vehicle and having means on such implement under the influence of the hydraulic or power system of the vehicle for raising and lowering the implement and in which the major portion of the weight of the implement will be carried by the vehicle and the remainder of the weight will be carried by the implement support means.

A further object of the invention is to provide an earth-working implement having a pivotally mounted jack-knife tongue and providing hydraulic means for causing the tongue to be disposed substantially in alignment or to cause portions of the tongue to be disposed at an angle to each other to raise the forward portion of the implement out of engagement with the earth.

Figure 2:
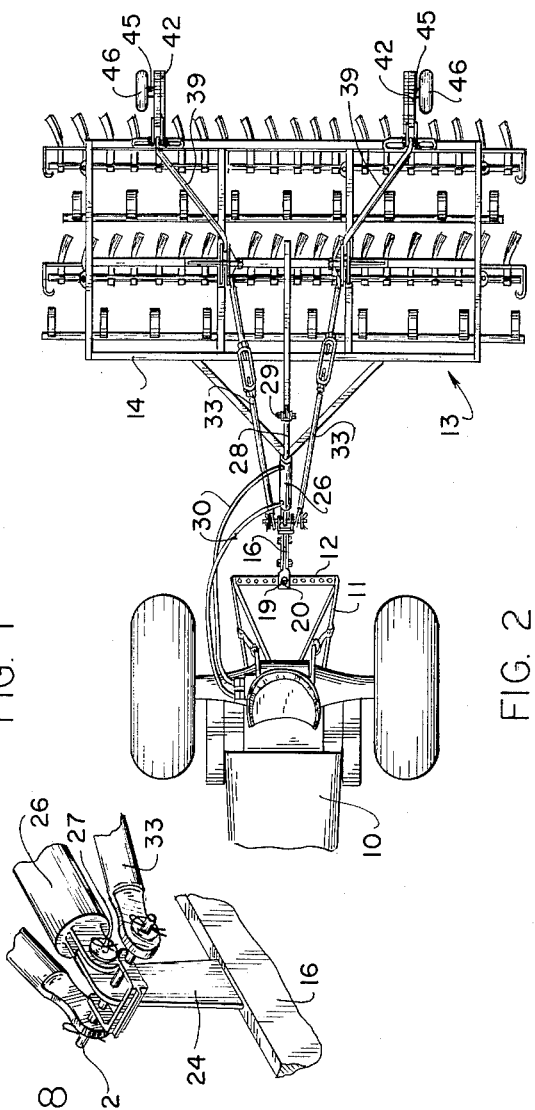

Other objects and advantages of the invention will be apparent from the following description taken in conjunction with the accompanying drawings in which:

FIG. 1 is a perspective illustrating one application of the invention;

FIG. 2, a top plan view thereof on a reduced scale;

FIG. 3, a side elevation illustrating the implement in raised position;

FIG. 4, a view similar to FIG. 3 illustrating the implement in engagement with the earth;

FIG. 5, a perspective of the tongue and mechanical linkage of the present invention;

FIG. 6, an enlarged fragmentary section taken along the line 6—6 of FIG. 5;

FIG. 7, an enlarged perspective of the mechanical lever; and

Figure 8:
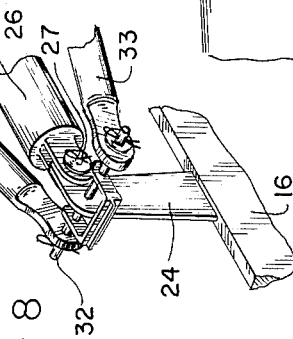

FIG. 8, an enlarged perspective of the lug of the second tongue illustrating the means for connecting the fluid cylinder and the mechanical linkage.

Briefly stated the present invention comprises mechanisms including a frame on which one or more earth-working implements are attached and such frame is provided with a segmental tongue for engaging a propelling vehicle and in which such tongue is provided with a pair of upwardly extending lugs between which a fluid cylinder is disposed and such cylinder is under the influence of the fluid system of the propelling vehicle. A pair of mechanical linkages are connected at one end to one of the lugs and the opposite ends of such linkages are connected to wheel mounting members in such a manner that when the fluid cylinder is operated the forward portion of the implement will be raised by the misalignment of the tongue and the rear portion of the implement will be raised by the mechanical linkages operating the wheel-supporting members.

With continued reference to the drawings a tractor 10 or other propelling vehicle is provided having a pair of lift arms 11 connected by a draw bar 12. A cultivator or other earthworking implement 13 is mounted on a frame 14 having a fixed tongue 15 projecting forwardly therefrom. A second or segmental tongue 16 is connected at one end to the fixed tongue 15 by a pivot 17 and the opposite end of such segmental tongue is connected by a pivot 18 to a yoke 19 which in turn is connected to the draw bar 12 by a pin 20. The end of the fixed tongue 15 projects forwardly of the pivot 17 and is provided with a stop 21 to engage the segmental tongue 16 when in lowered position to retain the tongues 15 and 16 substantially in alignment.

In order to elevate the frame 14 and the earth-working implement 13 carried thereon, the segmental tongue 16 is provided with an upstanding lug 24 and the fixed tongue 15 is provided with a corresponding upstanding lug 25. A fluid cylinder 26 is connected at one end by a pivot 27 to the free end of the lug 24 and such cylinder has a piston rod 28 connected by a pivot 29 to the free end of the lug 25. The cylinder 26 is connected by fluid lines 30 to the fluid system of the tractor for extending and retracting the piston rod when desired.

When the earth-working implement is in engagement with the ground the fixed tongue and the segmental tongue will be disposed generally in alignment and pressure on the fluid cylinder 26 will be relieved so that the tractor will impart substantially a straight pull on the implement. When the cylinder is energized the piston rod 28 will be extended and the upper ends of the upstanding lugs 24 and 25 will be forced away from each other. Since the pivot 17 is disposed intermediate the upstanding lugs 24 and 25, the fixed tongue 15 and the segmental tongue 16 will be caused to move out of alignment with each other which will result in the fixed tongue being raised which in turn will raise the forward portion of the implement out of engagement with the earth. In this position approximately sixty percent of the weight of the implement will be supported by the tractor and approximately forty percent of the weight will be supported by the rear of the implement.

In order to raise the rear portion of the implement a pair of adjustable length arms 33 are pivotally connected at one end to a shaft 32 carried by the lug 24 and the opposite end of each of the arms is pivotally connected by a pin 34 to one end of a rocker lever 35. The lever 35 is rotatably mounted about a pin 36 carried by a support bracket 37 fixed to the frame 14. The opposite end of each of the levers is connected by a pin 38 to one end of a link 39, the opposite end of which is pivotally connected by a pin 40 to a yoke 41 fixed to one corner of a triangular wheel supported member 42. The member 42 is connected by a pivot 43 at a second corner to a pair of brackets 44 mounted on the frame 14. An axle 45 is fixed to the third corner of the member 42 and such axle is adapted to rotatably receive a wheel 46. The distance between the pivot 43 and the axle 45 is approximately three times the distance between the pivot 43 and the yoke 41 so that a substantially three to one ratio will exist between the movement of the link 39 and the wheel 46.

In the operation of the device when the earth-working implement is in engagement with the earth, the fixed tongue 15 will be substantially in alignment with the segmental tongue 16 so that the implement can perform its intended function. When it is desired to move the implement to another location the cylinder 26 is energized to extend the piston rod 28 and cause the fixed tongue 15 to move to a higher elevation and thereby raise the front portion of the implement above the level of the ground. Simultaneously, the arms 33 will exert a forward pull on the lower end of the lever 35 and cause the upper end to move in a rearward direction and thereby apply a pushing force on the link 39 which in turn will cause the wheel-supporting member 42 to pivot downwardly about the pivot 43 until the wheel 46 engages the earth. Continued movement of the piston rod will continue to exert force against the link 39 and since the wheel is no longer free to move downwardly the pivot 43 will be forced to move upwardly and raise the rear end of the earth-working implement out of engagement with the earth. The tractor can then move the implement to another location without the implement engaging the earth and when the new location has been reached the piston rod 28 is retracted to simultaneously raise the wheel 46 and to align the fixed tongue 15 and the segmental tongue 16 in which position the earth-working implements are again in engagement with the earth. During the time that the earth-working implement is raised the majority of the weight of the implements will be supported by the tractor and the remainder of the weight will be supported by the wheel 46.

It will be apparent that an earth-working implement has been provided with a jack-knife type of tongue in which the portion of the tongue on which the implement is mounted can be raised and lowered by a fluid cylinder under the influence of the fluid system of the tractor and simultaneously the raising of the front portion of the implement frame will automatically raise the rear portion so that the implement can be moved from one location to another with the weight of the implement being carried by the propelling vehicle and by a pair of ground-engaging wheels. When the implement is to be moved over a long distance, the implement can be raised to its uppermost position and supported in such position while the fluid cylinder is removed and replaced by a solid bar which will maintain the implement in raised position without the necessity of maintaining fluid pressure at all times.

It will be noted that although a cultivating implement has been illustrated the structure of the present invention is not limited to the particular implement and would be equally useful on such implements as road graders, sweeps, mowers, harvesting equipment, et cetera. Likewise, if desired, the wheel 46 may be used to function as a depth regulator to control the amount of penetration of earth-working implements or to control the proximity to the earth of implements which operate above the surface.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for raising and lowering an earth-working implement comprising a frame having a fixed tongue, a segmental tongue pivotally connected to said fixed tongue adjacent one end thereof, means connecting the opposite end of said segmental tongue to a propelling vehicle, an upstanding lug mounted on each of said fixed and segmental tongues, adjustable fluid operated means connecting the free ends of said lugs, arms each connected at one end to one of said lugs, a lever pivotally connected at one end to the opposite ends of each of said arms, means for pivotally mounting each of said levers intermediate its ends on said frame, a link pivotally connected to the opposite end of each of said levers, a plurality of wheel-supporting members independently pivotally mounted on said frame, means pivotally connecting each link with one of said wheel-supporting members, wheels rotatably mounted on said wheel-supporting members, and an earth-working implement mounted on said frame, whereby actuation of said fluid means in one direction will raise said frame and move said earth-working implement from engagement with the earth and actuation in the opposite direction will lower the frame and move said implement into engagement with the earth.

2. The combinaion of a frame, at least one earth-working implement mounted on said frame and pivotally connectable to a propelling vehicle of the kind having a fluid system, means for raising and lowering said implement, a first tongue extending outwardly from said frame, a second tongue pivotally connected at one end to said first tongue adjacent to the free end thereof, means connecting the opposite end of said second tongue to the propelling vehicle, said means for raising and lowering comprising an upstanding member mounted on each of said first and second tongues, fluid means connecting the free ends of said upstanding members, said fluid means being subject to the control of the fluid system of said vehicle, arms pivotally connected at one end to the upstanding member of said second tongue, levers having spaced ends and pivotally mounted intermediate the latter on said frame, the opposite ends of said arms being pivotally connected to the ends of said lever, a plurality of wheel-supporting means independently pivotally mounted on said frame, a wheel rotatably mounted on each of said wheel-supporting means, links pivotally connecting said levers and said wheel-supporting members, whereby actuation of said fluid operated means will raise or lower said earth-working implement.

3. Apparatus for raising and lowering an earth-working implement comprising a frame, an earth-working implement having front and rear portions mounted on said frame, an elongated tongue pivotally connected at one end of said frame and at the opposite end to a propelling vehicle, an upstanding member mounted on each of said tongue and said frame in spaced relation to each other, power operated means extending between said upstanding members, a plurality of brackets mounted on said frame, a lever pivotally mounted intermediate its ends on each of said brackets, first link means pivotally connecting one end of each lever to one of said upstanding members, a plurality of wheel-supporting members independently pivotally mounted on said frame, a wheel rotatably mounted on each of said wheel-supporting members, said wheels normally being out of engagement with the ground, second link means pivotally connecting said wheel-supporting members to the opposite end of each of said levers, whereby actuation of said power operated means will initially raise the front portion of said implement and continued operation of said power operated means will lower the wheel-supporting members and raise the rear portion of said implement out of engagement with the ground.

References Cited by the Examiner

UNITED STATES PATENTS

| | | | |
|---|---|---|---|
| 1,092,358 | 4/14 | Harden | 172—328 |
| 2,664,039 | 12/53 | Heckathorn | 172—328 |
| 2,717,479 | 9/55 | Scheidenhelm et al. | 172—328 |
| 2,830,519 | 4/58 | Chandler et al. | 172—328 |
| 2,866,281 | 12/58 | Breaux | 172—328 X |
| 2,955,369 | 10/60 | Shumaker et al. | 37—98 |
| 3,081,567 | 3/63 | Saul | 37—152 |

T. GRAHAM CRAVER, *Primary Examiner.*

ABRAHAM G. STONE, *Examiner.*